United States Patent
Luciano, Jr. et al.

(10) Patent No.: US 6,267,669 B1
(45) Date of Patent: *Jul. 31, 2001

(54) HYBRID GAMING APPARATUS AND METHOD

(75) Inventors: Robert A. Luciano, Jr., Reno; Anthony J Baerlocher, Carson City; Chris T. Brune, Reno; Jason Mayeroff, Las Vegas, all of NV (US)

(73) Assignee: International Game Technology, Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/450,825

(22) Filed: Nov. 29, 1999

(51) Int. Cl.$^7$ .............. A63F 13/00; A63F 9/24; G06F 17/00; G06F 19/00

(52) U.S. Cl. .................. 463/7; 463/9; 463/10; 463/20; 463/36; 273/269; 273/274; 273/454

(58) Field of Search .................. 463/7, 11, 12, 463/13, 16, 9, 17, 29, 19, 20, 10, 8, 30, 31, 36, 40, 41, 42, 25; 273/143 R, 269, 274, 292, 293, 454, 460

(56) References Cited

U.S. PATENT DOCUMENTS

| | | | |
|---|---|---|---|
| 3,853,324 | 12/1974 | Reiner et al. | 273/142 E |
| 3,866,921 | 2/1975 | Klock | 273/138 R |
| 3,877,700 | 4/1975 | Moe | 273/119 R |
| 3,923,305 | 12/1975 | Reiner et al. | 273/126 R |
| 4,012,046 | 3/1977 | Liket | 273/134 C |
| 4,129,304 | 12/1978 | Mager | 273/243 |
| 4,550,916 | 11/1985 | Ortiz | 273/239 |
| 4,582,324 | 4/1986 | Koza et al. | 273/138 |
| 4,615,527 | 10/1986 | Moss | 273/278 |
| 4,781,377 | 11/1988 | McVean et al. | 273/86 R |
| 4,805,907 | 2/1989 | Hagiwara | 273/138 A |
| 4,936,588 | 6/1990 | Rader et al. | 273/243 |
| 4,948,133 | 8/1990 | Helm et al. | 273/85 |
| 5,083,800 | 1/1992 | Lockton | 273/439 |
| 5,178,395 | 1/1993 | Lovell | 273/238 |

(List continued on next page.)

FOREIGN PATENT DOCUMENTS

| | | | |
|---|---|---|---|
| 3811301 A1 | 2/1988 | (DE) | G07F/17/34 |
| 2072395 | 9/1981 | (GB) | 273/143 R |
| 2083936 | 3/1982 | (GB) | 273/138 A |
| 2170636 | 8/1986 | (GB) | G07F/17/34 |
| 2182186 | 5/1987 | (GB) | G07F/17/34 |
| 2207268 | 1/1989 | (GB) | G07F/7/08 |
| 2222712 | 3/1990 | (GB) | G07F/17/34 |
| 2225889 | 6/1990 | (GB) | G07F/17/34 |
| 2130413 | 5/1994 | (GB) | G07F/17/34 |
| 4-114676 | 4/1992 | (JP) | A63F/5/04 |
| 3-270177 | 3/1993 | (JP) | A63F/5/04 |

OTHER PUBLICATIONS

Loose Change, *Old ideas make new ideas.*, Sep., 1996, pp. 22–24.

Primary Examiner—Jessica J. Harrison
Assistant Examiner—Binh-An D. Nguyen
(74) Attorney, Agent, or Firm—George H. Gerstman; Seyfarth Shaw

(57) ABSTRACT

A gaming device and method for a hybrid game including a coordination/dexterity portion and/or traditional game portion is provided. Preferably, both a coordination/dexterity game and a traditional game are part of a single hybrid game, both of which portions are played using a single display device. In one embodiment, a player first plays a coordination/dexterity game and is given an opportunity to play a traditional game upon the occurrence of certain predetermined or predefined events during play of the coordination/dexterity game. Preferably, game outcome for both portions is controlled by an already-approved controller, such as a traditional game controller.

5 Claims, 6 Drawing Sheets

U.S. PATENT DOCUMENTS

| | | | |
|---|---|---|---|
| 5,194,843 | 3/1993 | Jones et al. | 340/323 R |
| 5,308,065 | 5/1994 | Bridgeman et al. | 273/85 CP |
| 5,342,049 | 8/1994 | Wichingsky et al. | 273/119 R |
| 5,342,058 | 8/1994 | Giovannetti | 273/243 |
| 5,344,144 | 9/1994 | Canon | 273/138 A |
| 5,395,111 | 3/1995 | Inoue | 273/143 R |
| 5,409,225 | 4/1995 | Kelly et al. | 273/138 R |
| 5,411,268 | 5/1995 | Nelson et al. | 273/292 |
| 5,472,195 | 12/1995 | Takemoto et al. | 273/138 A |
| 5,531,440 | 7/1996 | Babrowski et al. | 463/13 |
| 5,649,862 * | 7/1997 | Sakaguchi et al. | 463/44 |
| 5,823,874 | 10/1998 | Adams | 463/17 |
| 5,947,823 * | 9/1999 | Nimura | 463/32 |
| 5,967,892 * | 10/1999 | Shoemaker, Jr. | 463/7 |
| 6,050,895 * | 4/2000 | Luciano, Jr. et al. | 463/7 |
| 6,110,215 * | 8/2000 | Stone | 703/6 |
| 6,139,429 * | 10/2000 | Shoemaker, Jr. | 473/7 |

* cited by examiner

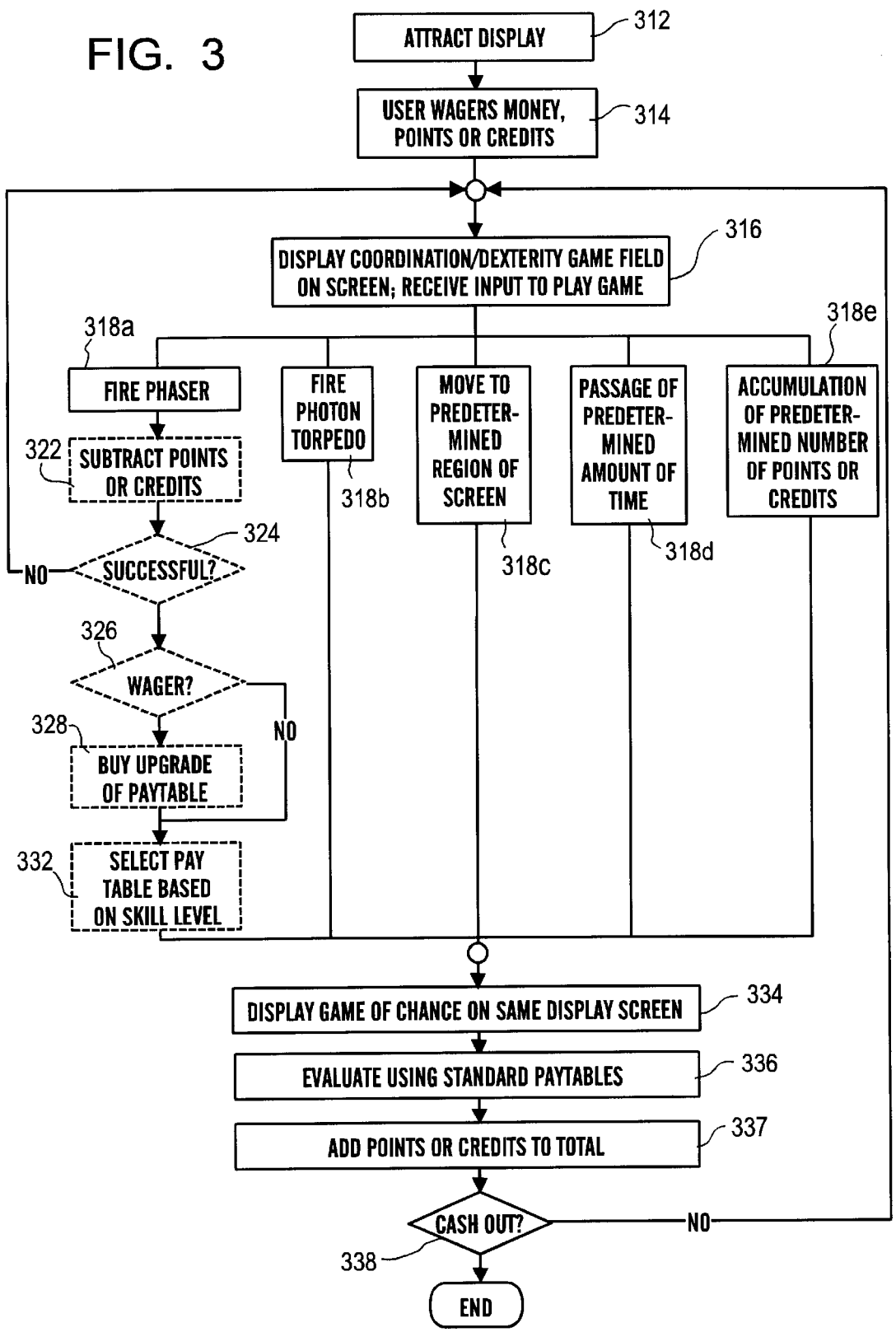

HYBRID GAMING APPARATUS AND METHOD

The present invention relates to a device and method for playing a game which is a hybrid of two or more games, and in particular for playing a game which is a hybrid of an hand/eye coordination or dexterity game preferably with a traditional game.

BACKGROUND INFORMATION

Electronic gaming devices and methods have been used for allowing players to play both traditional games (such as slot machine games, keno, poker, blackjack, and the like) and non-traditional games, particularly a variety of action games, such as simulated fighting games, simulated shooting games, simulated driving games, simulated sports games, and the like. It is believed that attempts to produce hybrids between these two types of games have not been fully successful, in the past, owing to a number of factors. Some previous devices have involved configuring or programming a microprocessor-based controller or other controller specifically to control both a traditional game and a non-traditional game or have involved providing two (or more) controllers, such as one for controlling a traditional game and a new controller for controlling a non-traditional game. However, in situations in which gaming is regulated, such previous approaches have typically required obtaining regulatory approval for the new combined controller or the new non-traditional game controller, often involving long delays and expense between the time when development on a hybrid game begins and the time when it has finally received necessary regulatory approval.

Some hybrid devices essentially positioned two physically separate gaming regions adjacent to one another (such as one above the other, one beside the other, etc.), and thus involved the cost of producing two separate gaming devices in order to play a single hybrid game. Similarly, hybrid game costs can be multiplied when controls or input devices are provided separately for two portions of a hybrid game.

Some approaches to hybrid games have appeared to be centered on traditional games, e.g., by requiring that a player play the traditional portion of a game, such as a slot machine game, first. It is believed that such traditional approaches may be limiting in the sense that they are less attractive to potential players who are primarily interested in non-traditional games.

Previous approaches to the hybrid game have further exhibited an orientation toward traditional games by configuring a game so that an action portion of the hybrid game is not activated in response to a winning or successful play, but rather is activated after any play of a first portion of the game or is activated after a losing play. In some cases, play of an action game may be configured to provide a result which merely assists or supplements the "main" traditional game, e.g., by providing additional chances at the traditional game.

Accordingly, it would be useful to provide a hybrid game apparatus and method which can eliminate or reduce the delay and cost for regulatory approval. It would also be useful to provide an apparatus and method which can make dual use of some components such as display components, and/or input or control components. It would further be useful to provide a hybrid game device and method without requiring a player to initially play a traditional game. It would further be useful to provide a hybrid game which emphasizes a non-traditional game, rather than basing progress to another game portion on any play of a first portion or losing play of a first portion.

SUMMARY OF THE INVENTION

The present invention involves a hybrid game, which includes at least a portion that involves skill, such as a hand-eye coordination and/or dexterity portion. When both portions of a hybrid game involve regulatory approval, such as approval of a controller, preferably a single controller (or two substantially identical controllers) ultimately controls game outcome with respect to both parts of the hybrid game. Thus, when the game-outcome-determining controller has already received regulatory approval (e.g., in the context of a non-hybrid game) the time and expense involved in regulatory approval in the hybrid game context is reduced.

Preferably, the game is implemented to permit wagering or gambling, and preferably the players' hand-eye coordination or other skill or dexterity can influence the payback percentage for at least some payback features of the hybrid game. In one embodiment, a second portion of the game cannot be played until at least one predetermined event has occurred during play of an initial portion of the game. In one embodiment, the initial portion is the portion which involves hand-eye coordination and/or dexterity. The event or events in the coordination/dexterity game which trigger the game of chance may be events whose probability is a function of the player's skill, or may be random events or otherwise unrelated to the player's skill.

In one embodiment, the game is implemented on an electronic gaming terminal, such as a computer-controlled gaming terminal having a single display screen, such that both portions of the hybrid game use the same display screen. Although there are two or more portions of the game in such a hybrid game, preferably the portions are coupled, such as by having a common point or credit accumulation which can be incremented by plays of either portion of the game. In one embodiment, at least one control or input device is used in playing both portions of the game.

In one embodiment a virtual map is associated with a coordination/dexterity game, such that each of a predefined plurality of actions that the player makes, or events which occur, in playing the coordination/dexterity portion of the game initiates an underlying traditional game, or game of chance, with the traditional game being initiated or selected in accordance with the virtual map.

In one embodiment, the gaming system is configured to accommodate third party or side bets on the game, and particularly on a coordination/dexterity game or portion of a game.

BRIEF DESCRIPTION OF THE DRAWINGS

FIG. 3 is a flow chart of a gaming process according to an embodiment of the present invention;

DETAILED DESCRIPTION OF THE PREFERRED EMBODIMENTS

Figure 1A:
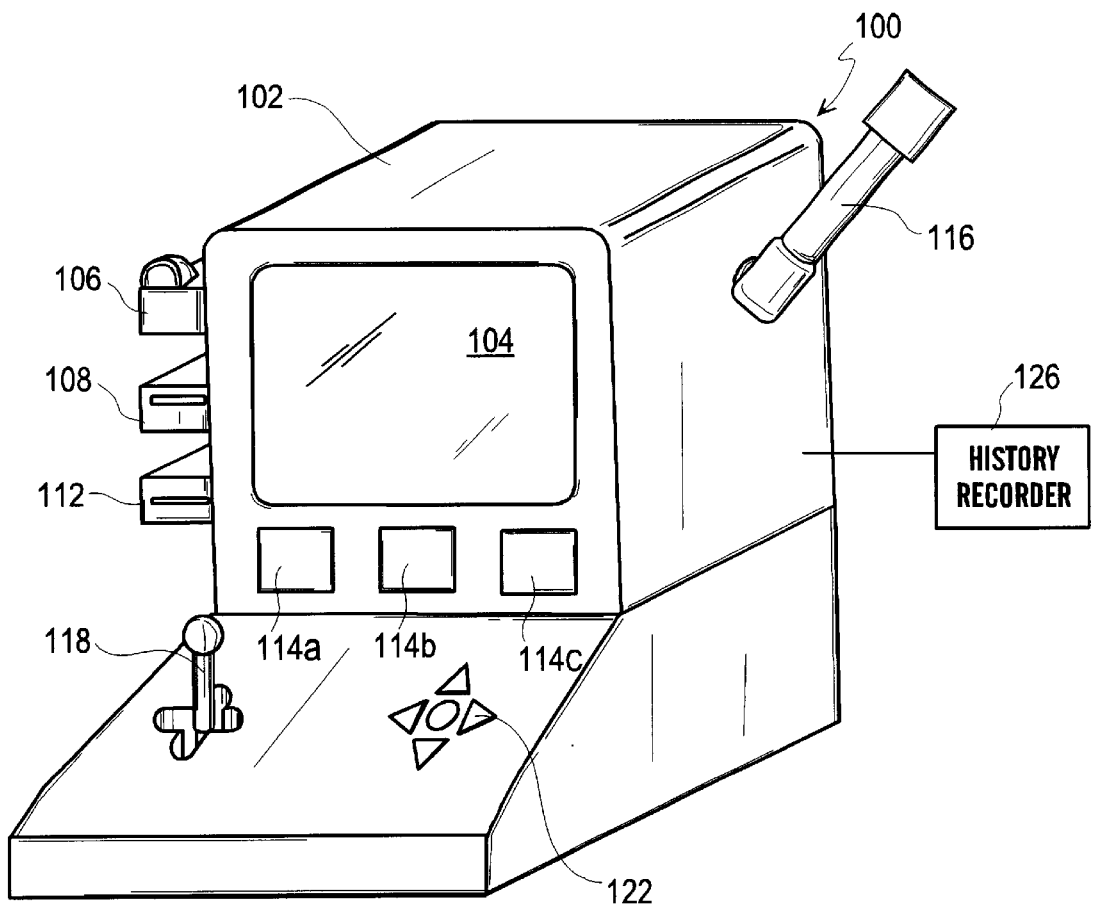
FIGS. 1A and 1B are schematic perspective views of the external appearance of gaming terminals according to embodiments of the present invention.
Figure 1B:
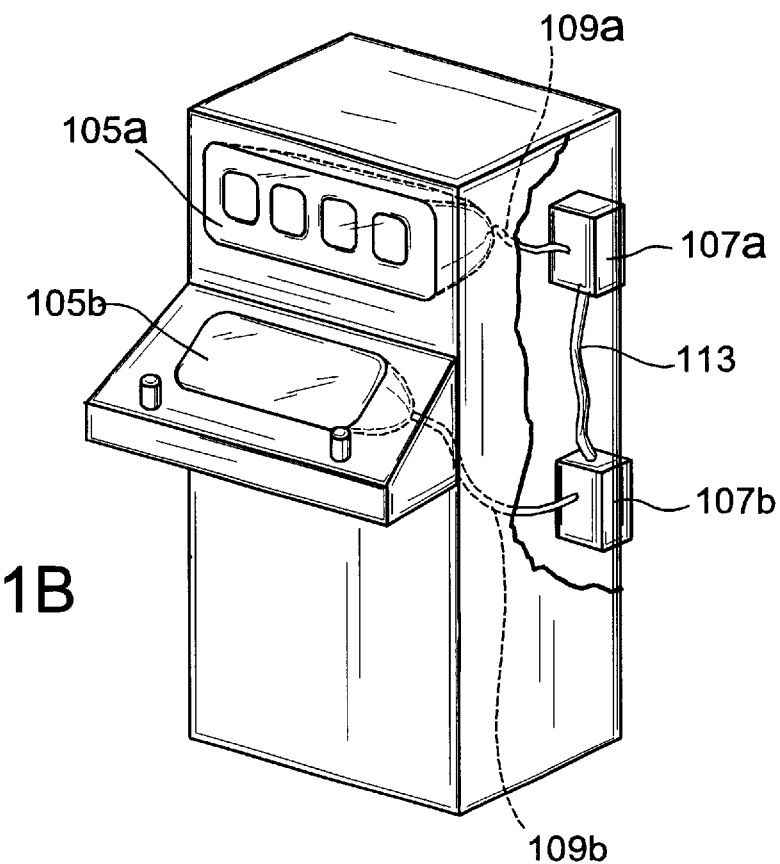

Although the present invention can be implemented using a number of types of hardware devices, FIGS. 1A and 1B are provided to illustrate, in schematic form, examples of electronic gaming terminals that can be used in connection with the present invention. As depicted in FIG. 1A, a chassis 102 is provided, which can be used for housing a computer or other controller for controlling the electronic terminal. A display screen 104 is coupled to the controller for providing output to the user, such as showing game characters, symbols, background, scores, points, bets, and the like. In one embodiment, the display screen 104 is coupled to or incorporates a touch screen device for providing input from the user. Preferably, wagering inputs are included, such as a coin acceptor 106, bill validator 108, and/or credit or other card reader 112. A number of devices may be provided for, permitting the user to control or provide input to the gaming terminal, such as buttons 114*a*, *b*, *c*, a slot-machine type handle 116, one or more joy sticks 118, cursor or other buttons 122, and the like. When the game is configured for play by two or more players, additional input and/or output devices may be provided. It is common in the gaming industry to provide for electronic gaming terminals, and those with skill in the art will understand how to construct and program such gaming terminals to implement a game according the present invention, after reading and understanding the present description.

FIG. 1B depicts an embodiment which has two separate and spaced-apart displays. In the embodiment depicted in FIG. 1B, an upper display 105*a* can be used for displaying a traditional game and the second display 105*b* can be used for a coordination/dexterity game. The displays 105*a*, 105*b* may be, for example, Cathode Ray Tube (CRT) displays. In one embodiment, one of the displays such as that used for the coordination/dexterity game 105*b*; is configured for three-dimensional display. In the depicted embodiment, each screen 105*a*, 105*b* is controlled by a separate controller device 107*a*, 107*b* which may be a microprocessor-based controller such as a processor board, personal computer, or the like. Communication links such as cables 109*a*, 109*b* provide for signals between the displays 105*a*, 105*b* and controllers or processors 107*a*, 107*b*. A communication link such as a bus or cable 113 accommodates synchronizing game play between the coordination/dexterity game displayed on display 105*b* and the traditional game displayed on display 105*a*.

Although it would be possible to control both displays from a single computer or processor, providing separate processors 107*a*, 107*b* is believed to facilitate retrofitting older devices (such as coordination/dexterity-only games) to provide features of the present invention. Preferably, all, or at least some, features of the game which require regulatory approval are provided by using a controller which is identical, or substantially identical, to a controller which has already received regulatory approval. For example, in providing a hybrid game which includes a traditional electronic poker game, controller by a controller approved in many jurisdictions, with a non-traditional game (such as space travel game of FIG. 3, golf game of FIG. 6 and the like) it is preferred to configure the game such that the win/loss outcome of the non-traditional game is controlled by the same controller which controls the game outcome of the traditional game, and which has, preferably, already received regulatory approval. In some cases, it may not be feasible to use a controller which is 100% identical to a previously-approved controller, e.g., since it may be desired to provide modifications for coordinating the traditional and non-traditional games, e.g., as described below. Even when the controller that determines game outcome of the non-traditional game is not 100% identical to an already-approved controller, the benefits of the present invention can be enjoyed if there is substantial identity, i.e., sufficient identity that the amount of time or expense involved in obtaining regulatory approval is reduced, compared to that which would be required for approval of a completely new controller.

Although the embodiment of FIG. 1B depicts the controllers 107*a*, 107*b* as being located in physically separate locations, coupled by a cable 113, in one embodiment, the traditional (approved) controller and the non-traditional-game controller may be located physically in the same housing and/or on the same printed circuit board (S) or otherwise more integrated than shown in FIG. 1B, with the above-described benefits still being available if time or expensive regulatory approval for such integrated device is reduced. In yet another embodiment, it may be possible to provide for first and second separate controllers 107*a*, 107*b* in which both controllers are identical to, or substantially identical to, controllers used for controlling traditional games and which have received regulatory approval. In this embodiment, a traditional-game controller may be used in controlling a non-traditional game by interposing an output converter between the controller 107*b* and the non-traditional display 15*b* or modifying software or firmware to convert the traditional game output so as to control a display associated with a non-traditional game. By retaining an approved controller and merely modifying the display while retaining game-outcome-determining aspects of the (approved) controller, it is believed that regulatory approval for the hybrid game can be facilitated.

Figure 7:
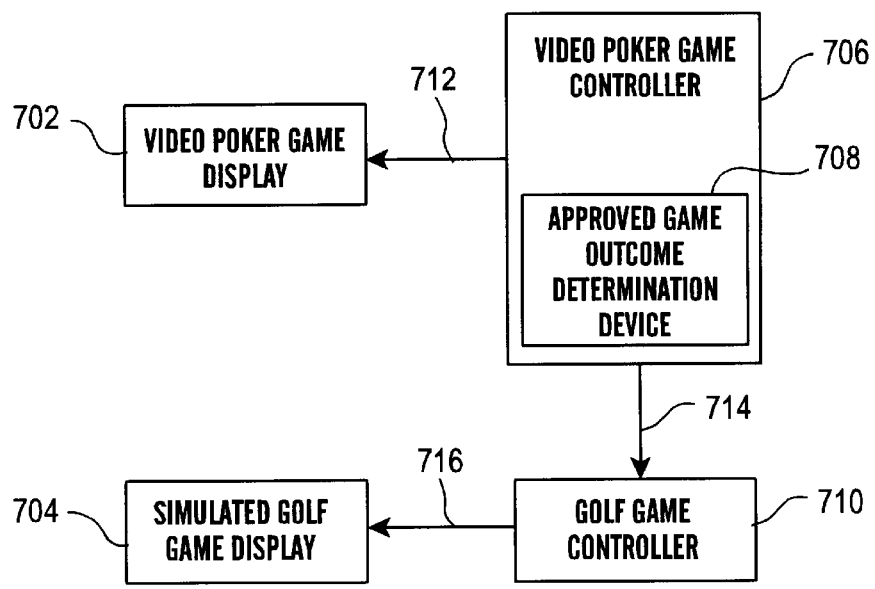
FIG. 7 is a block diagram of an apparatus according to an embodiment of the present invention.

FIG. 7 depicts an example of a hybrid game apparatus according to an embodiment of the present invention, in block diagram form, in which the traditional game is a video poker game and the coordination/dexterity game is a simulated golf game. In the embodiment of FIG. 7, the apparatus includes a display device for the video poker game 702 and a display device for the simulated golf game 704, although it is possible to provide for embodiments in which both games share the same display device, such as a cathode ray tube (CRT) or other display device. A video poker game controller 706 controls the display for the video poker game 702 and includes an outcome determination device 708 which may be, e.g., a computer, microcontroller or similar programmed device and associated programming. In the depicted embodiment, at least the outcome determination portion of the video poker game controller has been approved by a regulatory authority. In the embodiment of FIG. 7, a golf game controller 710 is coupled to the simulated golf game display 704 for controlling the display. However, the golf game controller 710 does not provide for game outcome determination with respect to the simulated golf game. Instead, the approved game outcome determination device 708 both determines the outcome of the video poker game display (e.g., via communication link 712) and determines the outcome of the simulated golf game (e.g., via golf game controller 710 and communications links 714, 716).

One manner of distinguishing a traditional game from other games is on the basis of the types of skill (if any) that may be required. As used herein, a coordination/dexterity game includes those in which the ability to achieve a desired outcome such as a win of the game or accumulation of intermediate points is at least partially determined by how long it takes a user to provide a particular input to the game. This ability may be generally referred to as dexterity. A particular type of dexterity involves an eye coordination dexterity, such as hand-eye coordination (although other types of coordination may be provided, e.g., to accommodate disabled persons). As one example, in a simulated fighting game, if an opposing character is displayed on the screen as throwing a punch at a given player's character, the likelihood of a successful outcome for that player is related to how quickly that player may provide input which will control the player's character to block or duck from such punch. In another example, in a simulated driving situation, the probability of a successful outcome may depend on how quickly the player provides input to veer a simulated vehicle away from a simulated obstacle. Thus, in both examples, the player, to be successful must quickly coordinate the control or input he or she provides to the gaming terminal with what is seen on the display screen. Not all dexterity games necessarily require coordination. For example, a dexterity game without coordination could involve a player repeatedly pushing a button at the highest possible frequency (regardless of visual or other factors). In some coordination/dexterity games, success depends on accuracy in some sort of aiming decision, such as in a simulated golf or other ballgame. In contrast, traditional games, while there may be some amount of skill involved, e.g., in selecting which cards to discard in a draw poker game, do not require aiming, and do not penalize a player for taking a moment to consider, e.g., which cards to discard (within limits). I.e., of two players who make otherwise identical poker plays, in a traditional game, the slower player is typically not penalized compared to the faster player. For purposes of the present descriptions, games or portions of games which involve dexterity and/or coordination such as those described above, will be referred to as coordination/dexterity games.

Figure 2:
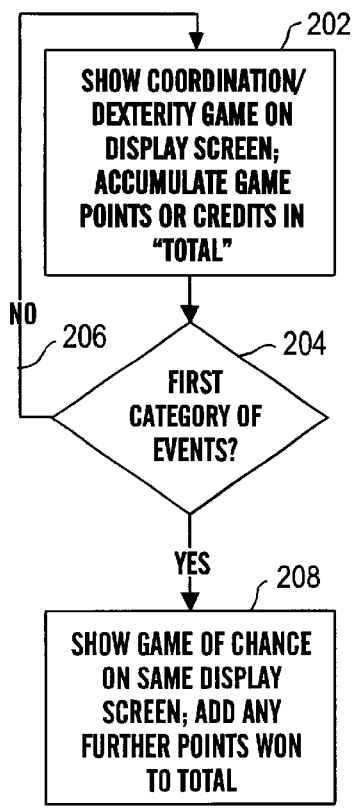
FIG. 2 is a flow chart of a gaming process according to an embodiment of the present invention.

As depicted in FIG. 2, in one embodiment the hybrid game involves two portions, one of which is a coordination/dexterity portion; the other, a traditional game. In the embodiment depicted in FIG. 2, the initial portion is a coordination/dexterity portion, and the procedure begins by displaying 212 the coordination/dexterity game on the display screen 104, to permit the user to play the coordination/dexterity portion of the game. Preferably, as the user plays the coordination or dexterity portion, the user may accumulate points and/or credits, the total of which is summed by the computer or other controller of the gaming terminal 102, and is preferably displayed to the user. As used herein, "points" are not directly converted to a monetary output (i.e., cannot be directly "cashed out"), while "credits" can be directly converted to a monetary output and cashed out. In one embodiment, it is only the second portion of the game that provides the player with an opportunity to receive monetary rewards, i.e. awards credits, such that the function of the first portion of the game is to provide users with a chance to continue on to the second portion of the game, and thus to an opportunity for monetary prizes.

As the user plays the coordination/dexterity game, the computer monitors the play to detect the occurrence of certain predefined trigger events which will permit play of the traditional game. As will be clear to those of skill in the art, such monitoring and detecting can be performed in a number of ways, the two main categories of procedures for bringing such events to the attention of a controller being polling procedures (in which the computer repeatedly sends a message to peripheral devices, or performs a check on selected memory locations, to determine whether events have taken place) and interrupt procedures (in which peripheral devices send messages to the computer, in response to occurrence of an event). In some embodiments, the trigger event may involve the concurrence of two or more items such as receiving a particular type of input from a user at a time that a display is being controlled to display a particular type of image. For example, one trigger event may be a user providing input to fire a simulated laser at a time when a simulated spaceship is within a predefined portion of the display screen. Thus, some trigger events may be related to normal occurrences during play of the coordination/dexterity portion of the game. It is also possible to provide embodiments in which trigger events are unrelated to play of the coordination/dexterity game, such as passage of a predetermined amount of time, or, e.g., a simulated golfball landing on a secret, invisible or moving region or symbol.

If one of a first class of events is not detected, the procedure returns 206 to continue play of the coordination/dexterity game 202. Upon the occurrence of one or more predefined events or types of events 204, a second portion of the game is played. Preferably the second portion 208 is a traditional game, such as a game of chance. Preferably the second game portion is played without the need for providing a second display device 104. Although it may be possible to play the second game portion 208 without generating any display depicting the second portion of the game, preferably some type of display depicting the second portion of the game is shown on the same display device 104 which was used in connection with playing the coordination/dexterity portion of the game. In one embodiment the second portion of the game occupies the entire display 104 to the exclusion of the coordination/dexterity game. In another embodiment, the display which is associated with the second portion of the game occupies only a portion or window of the display screen 104, leaving the remainder of the screen available for continued display related to the coordination/dexterity game. In another embodiment, a second portion of a game may involve providing a user with a chance at a progressive or other prize, without requiring any input from the user. In this case, the second portion of the game may be played, if desired, without providing a display or other indication to user that this game is being played. Thus, if desired, the hybrid game may be configured so that the user is aware of a first portion of the game, but is unaware of the second portion of the game unless the player wins a prize.

A number of types of traditional games can be provided as the second game portion, including a slot machine game, a roulette wheel game, a wheel of fortune game, a poker game, a keno game, a blackjack game and the like. In some cases the second game portion may be configured to play automatically, i.e., without requiring input from the user. In other cases, such as draw poker, blackjack and the like, the game may be configured to accept input from the user related to the second game portion. Although it is possible to maintain separate point or credit totals for the two portions of the game, preferably, the results from the second game portion are used to award points or credits to the player, which are added to the total points which are earned during the coordination/dexterity game.

Figure 4:
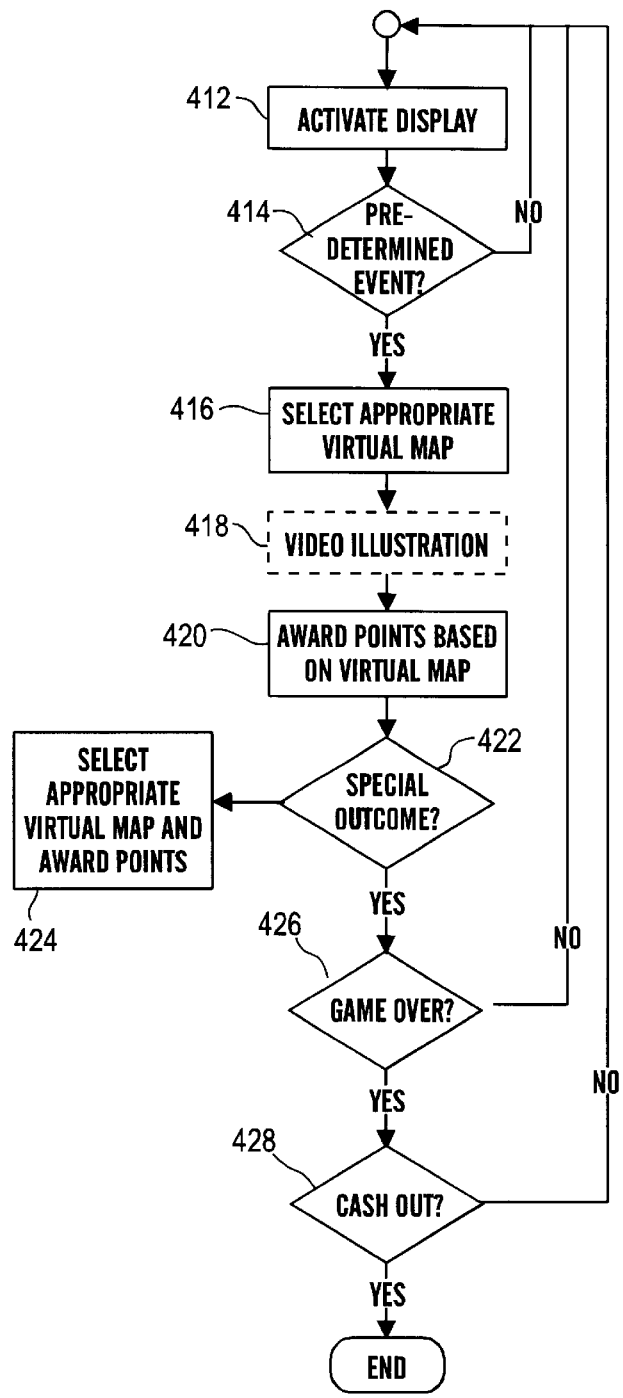
FIG. 4 is a flow chart of a gaming process according to an embodiment of the present.

FIG. 4 illustrates an embodiment involving a virtual map. In this embodiment, a virtual map provides information relating events to points or credits. In this embodiment, a first coordination/dexterity game display is activated 412 for display on the screen 104. And the user plays the coordination/dexterity game using input devices as described above. In response to the occurrence of various predefined events 414, a virtual map is consulted 416. In one embodiment, a single virtual map is provided, which relates each of the possible trigger events to points or credits. It is not necessary that the points be related to the degree of success of the event. For example, in a simulated basketball game, the player may receive 2 credits in response to a three-point shot, and may receive 50 credits for a missed free throw.

In another embodiment, different virtual maps are available, and selection among the possible virtual maps may be done in a number of fashions. In one embodiment, a virtual map is selected in response to a detected level of skill of the player (which may be evaluated as described above). Thus, virtual maps may be constructed to either enhance of diminish the effect of skill on overall odds. Virtual maps may also be selected in a fashion unrelated to player skill, such as randomly, in response to the amount or type of wager, etc.

Once a virtual map is selected, the number of credits to be awarded in response to the event is known. In one embodiment, it is desired to provide a graphic illustration 418 of the award of points to the user by displaying an image that may be associated by the user with the award of points, such as a display of a simulated slot machine or other game. The display of a slot machine need not be accompanied by playing a slot machine game, since the result is already determined, based on the virtual map. Regardless of whether a game illustration is provided 418, the credits specified by the virtual map 416 are awarded 420, and preferably accumulated credits or prizes are displayed.

In the embodiment of FIG. 4, following the award of points 420, a further evaluation is performed to determine whether a special outcome of the event 414 has occurred. A number of items can be defined as special outcomes. In one example, in a simulated fighting game, landing a punch may be an event which provides points according to a first virtual map 416. However, if landing of the punch results in knocking the opponent out 422, a special virtual map 424 is subsequently consulted and additional points are provided. After points are awarded according to a virtual map, if it is determined that the game is over 426, the procedure returns to the beginning in order to give the player an opportunity to initiate another game. Preferably, if the game is over the player is given an opportunity to cashout accumulated points 428. If the game is not over, the procedure returns to the coordination/dexterity game.

Figure 6:
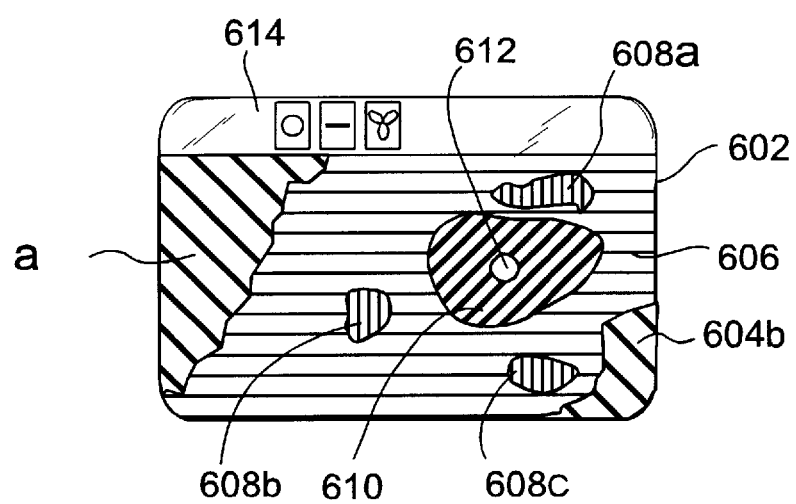
FIG. 6 is a plan view of a display that may be used according to an embodiment of the present invention.

Although in some embodiments it may be desired to initiate the traditional game in response to only certain predetermined ones of possible results, in other embodiments, it may be desired to initiate the traditional game following each play or action of the coordination/dexterity game. In one embodiment, while the traditional game may be initiated following each action or play of a coordination/dexterity game, the system may be configured such that the results of the coordination/dexterity game, while not being used to determine whether or not the traditional game is played, may be used to determine the manner in which the traditional game is played and/or its level of difficulty or probability of success. In some traditional games, the difficulty or probability of success is established by data commonly referred to as a pay table. The pay table data may establish what percentage of the time traditional-game play will result in a win and/or may establish the size of the prize or other reward for winning. Thus, in one embodiment, it is possible to use the outcome of the coordination/dexterity game to select among a plurality of different pay tables. This may be illustrated in the context of a simulated golf game (although this feature of the invention can be used in any of a variety of different coordination/dexterity games). FIG. 6 depicts a screen that may be used in connection with such a simulated golf game in which the screen 602 depicts, in its lower portion, a view of a portion of a golfcourse including regions defined as rough 604a, 604b, fairway 606, sandtrap 608a, 608b, 608c, green 610 and hole 612. As a player provides input to simulate a golf shot, the simulated golfball will land somewhere in the simulated golfcourse. According to one embodiment, if the simulated golfball lands on a first portion of the simulated course, e.g., the fairway, a traditional game, such as electronic slot machine game depicted in the upper portion 614 of the screen 612, is automatically played with the probability of win and/or type of prize or reward being determined in accordance with a first pay table (such as a pay table stored in memory of a processor 107a). However, if the golfball lands on a different region of the screen such as the green 610, the traditional game 614 will be played, but in accordance with a second pay table, different from the first pay table, to provide different odds of winning and/or different rewards or prizes. If desired, the pay tables may be configured to correspond to different regions of the coordination/dexterity portion of the screen 602 (e.g., using a "virtual map" as described above) in such a way that a player who achieves a better (i.e., closer to goal) result in the coordination/dexterity game is provided with a better outcome (i.e., higher probability of win and/or higher reward). For example, the simulated golf game of FIG. 6 may be configured such that the pay table corresponding to landing in the sand has a 95% payback, the pay table corresponding to landing in the rough has a 96% payback, the pay table corresponding to landing on the fairway has a 97% payback, the pay table corresponding to landing on the green has a 98% payback and the pay table corresponding to placing the ball in the hole has a 99% payback.

FIG. 3 depicts yet another example of a hybrid game. In the procedure depicted in FIG. 3, the gaming terminal 100 is initially configured in an idle or "attract" mode in which the screen 104 is controlled to output a display intended to invite users to play the hybrid game. Preferably, the system is configured to emphasize the coordination/dexterity portion of the game by showing an indication of that portion of the game during an attract mode 312.

A user who wishes to play the hybrid game may place a wager 314 (e.g., using an input device 106, 108, 112). In one embodiment, a user may wager points or credits which were accumulated on the gaming terminal 100 during previous play. After the placing of a wager 314, the gaming terminal 100 displays the coordination/dexterity portion of the game 316. For purposes of illustration, the embodiment of FIG. 3 will be described in terms of a simulated shooting game with a space travel theme, with the understanding that the present invention can involve any of a number of types and/or themes of coordination/dexterity games. In this example, during the display of the play screen 316, the screen 104 is controlled to display images which simulate the movement of various friendly or enemy spacecraft, asteroids or other obstacles, and the like. The user operates input devices such as joystick 118, buttons 114, 122, and the like, which may simulate the firing of various weapons, movement of the user's simulated spaceship and the like.

As the play proceeds, the computer, e.g., via a polling or interrupt procedure, receives information about the occurrence of certain events. As described below, some events are predefined as trigger events, i.e. event which may permit the player to play the second portion of the game. Various types of events may be identified. Some events may be events which are inputs provided by a user. Such inputs may be inputs which have consequences to the outcome of the coordination/dexterity game, such as input to fire a phaser 318a, or fire a photon torpedo 318b. Other events may be events which are related to play of the coordination/dexterity game, but do not have an immediate effect on game outcome or points, such as moving the spaceship to a given portion of the screen 318c. Still other events may be events which have no relation to ordinary play of the coordination/dexterity portion of the game, such as the passage of a predetermined amount of time 318d. Although in the embodiment depicted in FIG. 3, all three classes of events are used when notifying the computer, in another embodiment more or fewer classes of events can be defined as potential trigger events (as described below). For example, it may be desired to provide a fighting game with multiple characters, and to define various regions of the display screen. In one example, if a character is positioned over one region, a first event is deemed to occur, and if a character is moved over another region, a different event is deemed to occur. In another embodiment, it may be desired to declare the occurrence of an event at periodic or randomly-selected times during play of the first portion of the game. In some embodiments it may be desired to permit the user to select or influence which items will be potential trigger events, such as by allowing the user to increase the number of potential trigger events by increasing the amount of the wager 314. In another embodiment it may be desirable to randomly vary the number or types of events which are trigger events, e.g., by providing different trigger events each time a user initiates game play 314, or to vary the number or identity of trigger events during play of the game. If desired, the gaming terminal 100 may be configured to output an indication of which trigger events are currently active, so that a user may adjust game play according to which trigger events are currently active.

The occurrence of a trigger event 318a to 318e in some embodiments may lead unconditionally to play of the second portion of the game. In the embodiment of FIG. 3, occurrence of a trigger event 318a results in playing the second portion of the game only under certain conditions. Although in the example of FIG. 3 only one trigger event 318a is a conditional trigger, other embodiments may be provided in which all predefined events are conditional triggers, some predefined events are conditional triggers, or all predefined events are non-conditional triggers. Although FIG. 3 depicts certain types of conditions on trigger 318a, other embodiments may use only some, all or more conditions for triggers or may have different conditions for the different triggers. In the embodiment of FIG. 3, after a first trigger event 318a, the game is configured to subtract a number of points or credits from the total 322, as a cost for taking an action such as firing a phaser 318a. If desired, the game may be configured to declare an "end of game" if insufficient points or credits are available. In the embodiment of FIG. 3, a determination is made whether the result of the trigger event 318a meets a predetermined criterion of success 324, such as determining whether the simulated phaser which was fired struck a simulated enemy spacecraft. In the embodiment of FIG. 3, an unsuccessful first trigger event returns the user 326 to the main coordination/dexterity game or screen. If desired, the game may be configured to increment the total credits or points in response to a successful event.

In the depicted embodiment, when a user is to be permitted to play the second portion of the game, the user may be given an opportunity to make an additional wager 326 and, if desired, to affect the odds or pay lines, e.g., by making an additional wager 328. In one embodiment, the odds, pay lines or pay tables associated with a second portion of the game may be selected at least partially in response to an indication of the level of skill of the player 332. The level of skill of the player may be indicated by a number of items such as the current value of the total points, the rate of accumulation of points, the number and/or types of successes 324, and the like. In one embodiment it may be desired to adjust odds or pay tables in such a way as to enhance winning opportunities or otherwise reward particularly skillful players. In another embodiment, it may be desired to reduce or minimize the effect of skill on the overall odds by providing skilled players with less favorable odds or pay tables for the second portion of the game, lest un-skilled players be inordinately disadvantaged. Thus, in one embodiment, although skilled players may have more chances to play the second portion of the game, the overall game success may be reasonably close to that of unskilled players, since the difficulty of winning the second portion of the game will be increased for more skilled players.

When a user achieves an opportunity to play the second portion of the game, the display device 104 is controlled to display a screen appropriate to the second portion of the game. In one embodiment, the second portion of the game appears in a window of the screen 104. Thus, in one embodiment, if a user fires a phaser 318a and strikes an enemy starship, a window will open showing, e.g., a simulated slot machine or a poker game, or a roulette wheel. In one embodiment, the game portion which is played during the second portion of the hybrid game is always the same. In another embodiment, different types of game portions may be played during the second portion of the hybrid game, such as randomly selecting a second portion game from among a plurality of choices, and/or providing different second portion games in response to different types of triggers. In one embodiment, different second portion games may be displayed either sequentially or simultaneously in different windows. For example, in one embodiment if a user playing the first portion of the game strikes one enemy ship with a phaser and another enemy ship with a photon torpedo, the game may be configured to display a roulette wheel in one window and a keno table in another window.

The games from the second portion of the hybrid game may be operating simultaneously with the continuing coordination/dexterity game portion, or the coordination/dexterity game portion may be suspended until some or all of the game second portions are finished. In either case, the second portions may be configured to operate automatically (such as a slot-machine game in which the simulated wheels are automatically spinning) or may require some user input (such as selecting discard cards in a draw poker game).

Preferably, as with typical electronic devices for playing traditional games, the results of a second portion are evaluated according to pay tables. In one embodiment, a single pay table is provided for evaluating any and all second portions. In another embodiment, different pay tables are associated with different types of games and/or different trigger events. In another embodiment the pay table to be used is selected, depending on user input, and/or skill 332.

The evaluation according to the selected pay table may result in the award of monetary output, points or credits. In one embodiment, these are added to the total points or credits 337. In one embodiment a user may be given an opportunity to cashout accumulated credit 338. Otherwise, the procedure returns 342 to the coordination/dexterity portion of the game 316.

As yet a further example illustrating hybrid games, the following describes a portion of a simulated fighting game:

1. Player inserts one dollar to play the amusement game, which also buys 100 gaming credits on the game;
2. Player controls input devices so as to simulate punching a fighter displayed on the display screen. The punch costs the player one credit, which is deducted from the total. The virtual map in use indicates that an award of three credits should be given to the player;
3. The player controls input devices so as to simulate a kick to another character. The kick costs the player one credit, which is deducted from the total credits displayed, and the virtual map for this game action selects an outcome resulting in an award of zero player credits;
4. The player lands a punch, which costs the player one credit, but the punch knocks the opponent out. The knock-out result has a special virtual map which results in awarding the player 100 credits;
5. The game being over (because the opponent has been knocked out) the player can continue to play or can cash out his credits.

Figure 5:
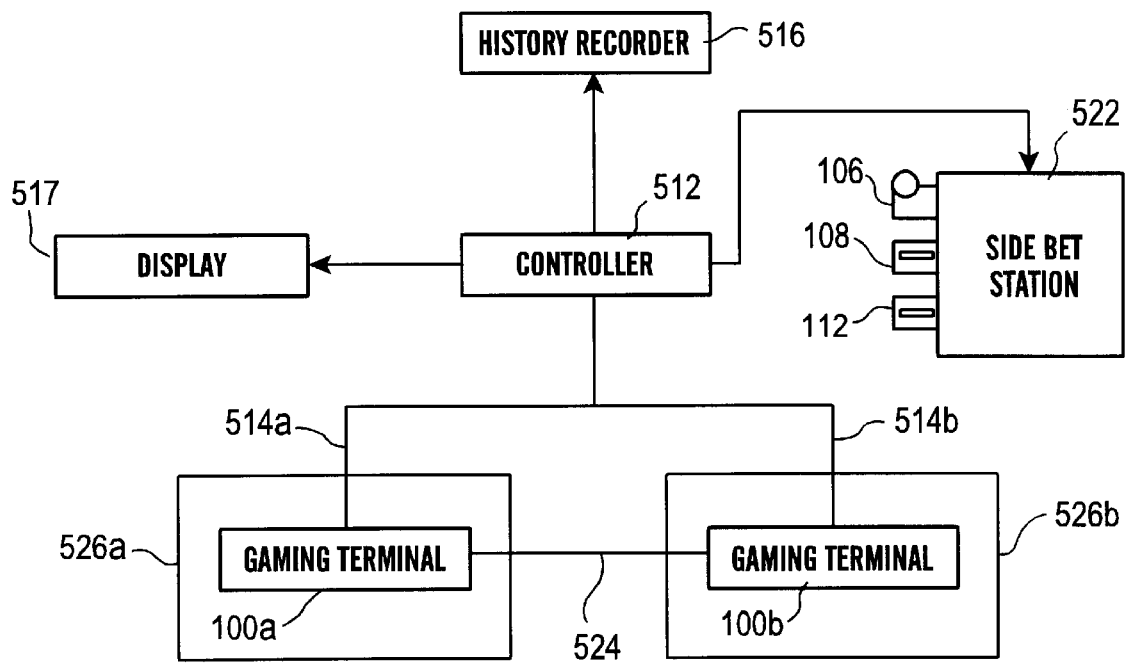
FIG. 5 is a block diagram of a system for accommodating side bets according to an embodiment of the present invention.

In one embodiment it may be desirable to permit wagering by third parties, i.e., so-called side bets, particularly in regard to a play of a coordination/dexterity game or portion of a game. In the embodiment of FIG. 5, a gaming terminal 100a, such as that depicted in FIG. 1, is configured for playing a game involving coordination/dexterity, preferably a hybrid coordination/dexterity game as described above. Preferably the gaming terminal 100 includes a memory or other recording medium 516 for storing a history of at least a portion of the game play 126, e.g., so that a user can later review the game play to assure himself or herself that proper prizes were awarded. The gaming terminal 100 is coupled to a controller 512, such as by a local area network 514. The controller 512 receives information regarding a play of the game on the gaming terminal 100a, including, e.g. the accumulation of player points or credits. Preferably, controller 512 receives information from the gaming terminal 100a sufficient to permit the controller to output a display 517, which shows the progress of the coordination/dexterity game. In one embodiment, the display 517 may be the same display being viewed on the gaming terminal 100a. If desired, the controller 512 may be coupled to a recording device 518, such as a computer memory or other device for recording information so that a player or bettor may review previous play to assure himself or herself of the proper award of prizes. Preferably, a side bet station 522 is coupled to the controller 512, which includes input devices such as coin acceptor 106, currency validator 108, and card reader 112, so that third parties, i.e., parties not playing the game on the terminal 100a, may place bets on the outcome of the game. In one embodiment, the game is configured for play by two or more persons, and a second gaming terminal 100b may be provided, either adjacent or remote to the first gaming terminal 100a, or a single gaming terminal may be provided with input devices for use by two players. Preferably, the gaming terminals are coupled together 524, and/or to the controller 514a, 514b in such a fashion that the displays on the two gaming terminals 100a, 100b may be coordinated, to permit players to play against each other, such as by controlling different simulated vehicles in a simulated race, controlling different characters in a fighting game, controlling different teams in a simulated sports event, and the like. In one embodiment, it is desired to avoid or prevent communication between persons playing the game on the gaming terminals 100a, 100b and persons who may be placing side bets, in order to prevent a coordinated throwing of a game or other cheating. Thus, in one embodiment game players are placed in isolation booths 526a to prevent such communication.

Figure 8:
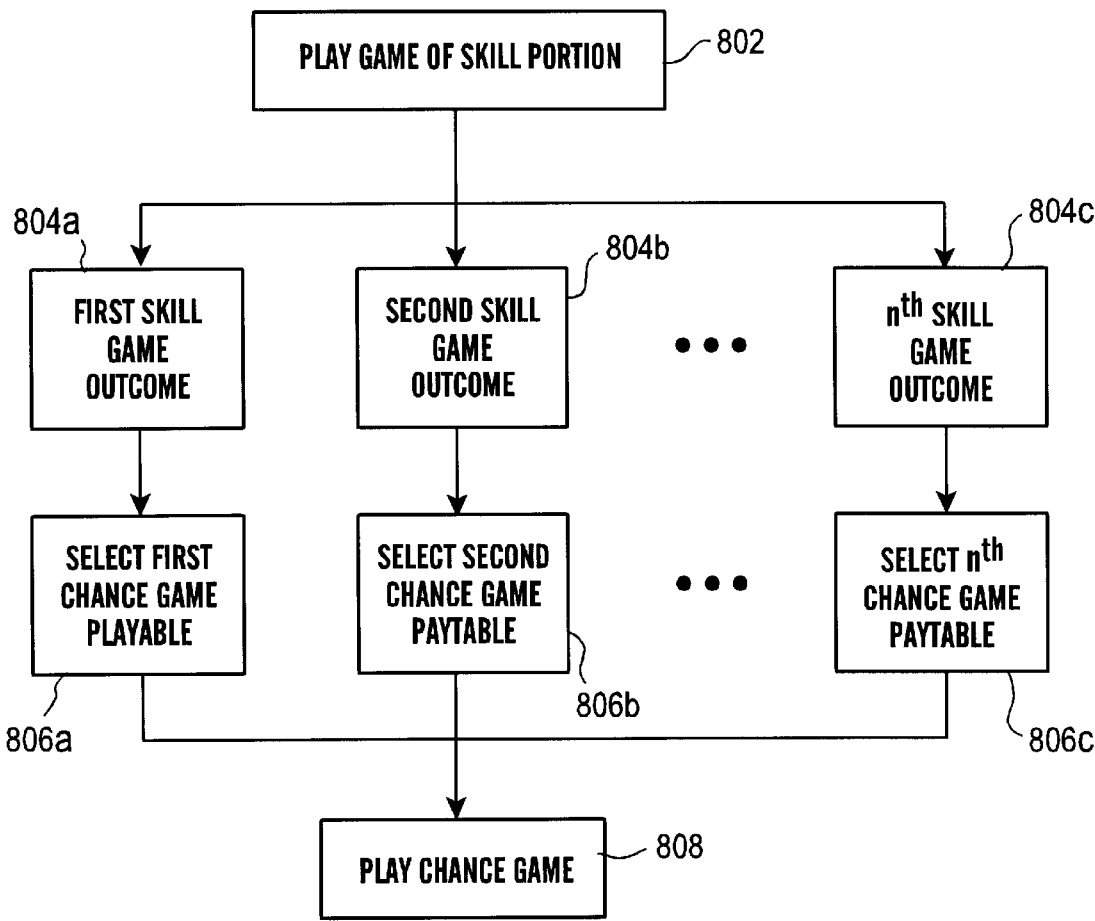
FIG. 8 is a flow diagram according to an embodiment of the present invention.

FIG. 8 illustrates, in flow diagram form, a hybrid game in which chance game pay tables are selected based on skill game portion outcomes. In FIG. 8, a user plays a skill game portion 802, resulting in any of N possible skill game outcomes 804a, 804b, 804c. The game controller, which is used for controlling the game of chance, selects a pay table which corresponds to the outcome of the skill game 806a, 806b, 806c and the user is then permitted to play the chance game 808 with the selected pay table being used for determining the probability of winning the prize and/or the size of prizes for the game of chance.

In light of the above descriptions a number of advantages of the present invention can be seen. The present invention affords the opportunity to play a hybrid game involving a coordination/dexterity portion and, preferably, a traditional game portion. While reducing costs, e.g., by using a common display screen and/or inputs or control devices, the present invention avoids the necessity for requiring players to play a traditional game before having an opportunity to play a coordination/dexterity game. In one embodiment, the present invention provides an opportunity to move to the second portion of the game only after the occurrence of predefined events in the first game portion (rather than, e.g. after every play performed on the first portion). In one embodiment, play of the second portion is permitted only after a win or successful event in the first portion, rather than, e.g. providing second portion play only in response to a loss in the first portion.

A number of variations and modifications of the invention can also be used. Although the embodiments described above provide for playing a coordination/dexterity game before moving to a second portion of the game, certain embodiments of the invention can be provided using a traditional gambling game as an initial portion such that when a given event occurs in the traditional game, an amusement game appears on the same video screen which was used for the traditional gaming device. As one example, such a game may start with a simulated video slot machine, such that if the player receives a result of three red sevens, the player receives 100 credits, the reels disappear, a fighting scene is displayed on the video display device, and a ten-second simulated fight starts. If the player, for example, lands three punches and knocks out the opponent, the player may be awarded additional credits for these actions, after which the fighting game is removed from the screen and the slot machine game appears again. If desired, two or more gaming terminals as described may be part of a system, such as a system which provides for one or more common prizes, in the manner known in the industry as a progressive or a wide-area progressive gaming system. Although the present invention has been described in the context of a hybrid between a traditional game and a coordination/dexterity game, the present invention can also be used in connection with other combinations, such as two or more different non-skill games, two or more different skill games and the like.

Although the invention has been described by way of a preferred embodiment, and certain variations and modification, other variations and modifications can also be used, the invention being defined by the following claims.

What is claimed is:

1. Hybrid gaming apparatus comprising:

display means for displaying a coordination/dexterity game portion wherein ability to achieve at least a first outcome, in said coordination/dexterity game portion, is at least partially determined by how long it takes a user to provide a particular input to the coordination/dexterity game portion;

a controller for determining game outcome of said coordination/dexterity game wherein said controller is substantially identical to a controller used for controlling a traditional game, wherein said traditional game provides substantially no penalty based on an amount of time it takes a user to provide a particular input to the traditional game, and wherein said traditional game can only be played, in said hybrid gaming apparatus, after playing said coordination/dexterity game portion; and wherein said particular input to the coordination/dexterity game portion involves eye-coordination dexterity.

2. Hybrid gaming apparatus comprising:

first display means for displaying a coordination/dexterity game portion wherein ability to achieve at least a first outcome, in said coordination/dexterity game portion, is at least partially determined by how long it takes a user to provide a particular input to the coordination/dexterity game portion;

second display means for displaying a traditional game portion, different from said coordination/dexterity game portion, wherein said traditional game provides substantially no penalty based on an amount of time it takes a user to provide a particular input to the traditional game;

a first controller, coupled to said first display means for controlling said first display means;

a second controller, coupled to said second display means, for controlling said second display means and for determining game outcome of said coordination/dexterity game portion and said traditional game portion and wherein said traditional game can only be played, in said hybrid gaming apparatus, after playing said coordination/dexterity game portion; and wherein said particular input to the coordination/dexterity game portion involves eye-coordination dexterity.

3. A method for use by a user in playing a hybrid game on a single gaming terminal, comprising:

providing a programmable computer coupled for controlling a first display device;

providing at least a first user input device;

controlling said first display device, using said computer, to display a first gaming display, to permit said user to play a first coordination/dexterity game portion for at least a first time period, using said input device, wherein ability to achieve at least a first outcome, in said coordination/dexterity game portion, is at least partially determined by how long it takes a user to provide a particular input to the coordination/dexterity game portion wherein said computer is configured to recognize the occurrence of any of a plurality of events during said first time period;

controlling said gaming terminal to display a second gaming display for a traditional game, wherein said traditional game provides substantially no penalty based on an amount of time it takes a user to provide a particular input to the traditional game, to permit said user to play a second game portion different from said first game portion;

wherein said computer is configured to display said second display automatically in response to at least a first one of said plurality of events and wherein said traditional game can only be played, on said gaming terminal, after playing said coordination/dexterity game portion; and wherein said particular input to the coordination/dexterity game portion involves eye-coordination dexterity.

4. A computer-implemented method for use by a user in playing a hybrid skill/chance game, said computer having an associated memory, the method comprising:

providing display means for displaying a skill game portion wherein ability to achieve at least a first outcome, in said skill game portion, is at least partially determined by how long it takes a user to provide a particular input to the skill game portion and a chance game portion, wherein said chance game portion provides substantially no penalty based on an amount of time it takes a user to provide a particular input to the chance game portion;

storing, in said memory, at least first and second payable for use with said chance game portion in determining the probability or amount of prize awards from play of said chance game portion;

allowing said user to play said skill game portion, wherein said skill game portion is configured such that play of said skill game portion can result in at least either of first and second skill game outcomes;

allowing said user to play said chance game portion using said first partible when said first skill game outcome is the result of play of said skill game portion, wherein said chance game can only be played, after playing said skill game portion;

allowing said user to play said chance game portion using said second partible when said second skill game outcome is the result of play of said skill game portion; and wherein said particular input to the coordination/dexterity game portion involves eye-coordination dexterity.

5. Apparatus for accommodating side bets comprising:

first electronic gaming terminal having a first display configured for playing a game of coordination/dexterity wherein ability to achieve at least a first outcome, in said coordination/dexterity game portion, is at least partially determined by how long it takes a user to provide a particular input to the coordination/dexterity game portion;

a central computer coupled to said first gaming terminal;

at least a first betting station separate from said first electronic gaming terminal coupled to said central computer configured to receive at least a first wager wherein said first betting station displays a payout amount related to an outcome of said game of coordination/dexterity; and wherein said particular input to the coordination/dexterity game portion involves eye-coordination dexterity.

* * * * *

UNITED STATES PATENT AND TRADEMARK OFFICE
CERTIFICATE OF CORRECTION

PATENT NO. : 6,267,669 B1
DATED : July 31, 2001
INVENTOR(S) : Luciano, Jr. et al.

It is certified that error appears in the above-identified patent and that said Letters Patent is hereby corrected as shown below:

Column 1,
Line 3, insert the following:
-- This application is a continuation of U.S. Application Serial No. 08/822,019, filed March 24, 1997, now U.S. Patent No. 6,050,895. --

Signed and Sealed this

Fourth Day of November, 2003

JAMES E. ROGAN
*Director of the United States Patent and Trademark Office*